INVENTOR.
ALLAN D. HAINES
BY
McNENNY, FARRINGTON, PEARNE & GORDON

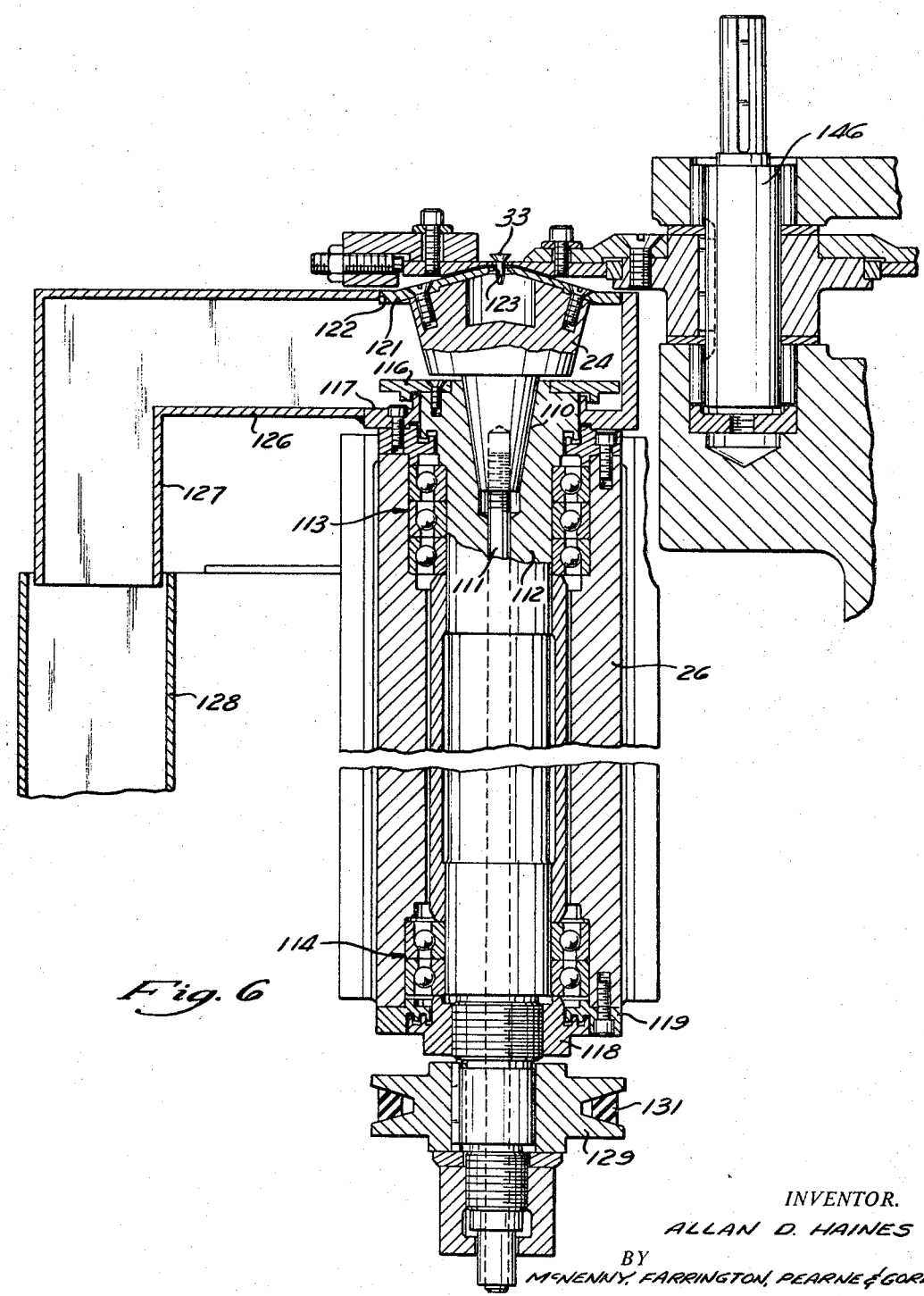

ATTORNEYS

INVENTOR.
ALLAN D. HAINES
BY
McNENNY, FARRINGTON, PEARNE & GORDON

ATTORNEYS

United States Patent Office 3,435,472
Patented Apr. 1, 1969

3,435,472
POINTER MECHANISM
Allan D. Haines, Tiffin, Ohio, assignor to The National Machinery Company, Tiffin, Ohio, a corporation of Ohio
Filed Jan. 28, 1966, Ser. No. 523,744
Int. Cl. B21k 1/44, 27/00; B23g 9/00
U.S. Cl. 10—21                                10 Claims

ABSTRACT OF THE DISCLOSURE

A bolt pointer is disclosed which includes an indexing dial provided with eight blank receiving recesses in its periphery. Power loading means are provided to position blanks in the dial for transport thereby to a pointing station. At the pointing station the blank is gripped and a rotating cutter is moved axially against the end of the blank. The cutter feed is arranged so that a constant amount of material is cut from the blank during each revolution of the cutter. After pointing, the blank is carried to a discharge location where it leaves the indexing dial. The drive for the various components is arranged so that the cutting is performed during a period at least equal to one-half the time of a cycle so that a high cyclic rate can be achieved without exceeding the cutter capacity.

---

This invention relates generally to automatic bolt forming machines and more particularly to a novel and improved pointer operable to point the ends of bolt blanks and the like and particularly suited for use with high speed headers and rolled threaders which are combined to automatically form bolts from wire stock.

The manufacture of completed bolts with machines which combine a header to upset and form a bolt head, a pointer to shape the shank end of the blank and a roll threader to form the threads on the bolt is well known in the art. In such machines the blanks formed in the header are automatically delivered to the pointer for pointing and subsequently automatically delivered to the thread roller for threading. In order to properly combine the subcombinations of such combined machines it is necessary to provide the pointing apparatus with sufficient capacity or speed of operation so that the cyclic rate of the pointing operation is at least as fast as the cyclic rate of the header. Similarly, the thread roller must have a sufficiently high cyclic rate to form the threads on all of the blanks formed in the header and pointed by the pointer.

The development of improved headers has permitted increased operating speeds of such machines. This is particularly true in the case of double-blow headers. Such double-blow headers are presently capable of operating sufficiently fast to produce certain sizes of bolt blanks at a rate of about 325 bolt blanks per minute. However, to realize the advantages of such increased header operating speeds it is necessary to provide a pointer also capable of operating at a cyclic rate at least equal to the maximum cyclic rate of the header so that a single pointer can be combined with the header and not limit the operating rate of the combined machine.

A pointer incorporating the present invention is constructed and arranged to permit its operation at a high cyclic rate so that a single pointer mechanism can be provided in a combined machine without limiting the production output of the high speed header and while still retaining the advantage of cutting tool pointing.

In order for a pointer to operate automatically it must be capable of performing all of the steps necessary for its operation within the period of time of one cycle of operation. These functions include obtaining positive control of the blank, feeding the blank into the pointing position, gripping the blank at the pointing position, cutting the point on the blank, releasing the gripping, and transporting the blank away from the cutting position. In a pointer incorporating the present invention some of these necessary functions are performed simultaneously with other functions to reduce the overall time required for a cycle of operation. In addition, the cycle of operation is arranged so that the actual cutting of the point on the blank occurs during a period exceeding half of the cycle time of the pointer and the cutting rate or feed is arranged to produce maximum cutting without overloading the cutting tool or producing excessive wear thereof.

An indexing dial is provided so that the movement of a pointed blank from the pointing position occurs simultaneously with the movement of the subsequent blank into the pointing position. This dial also permits the loading of the blank into the dial, to obtain positive control thereof, during the same time the cutter is operating. Further, the control of the blank that is maintained by the dial as it is carried into the pointing position is such that the gripping and release of gripping can be accomplished in a very short period of time. Finally, the rate of cutter feed is such that each revolution of the cutter removes substantially the same area or volume of material as the other revolutions so that maximum cutting efficiency is achieved without excessive loads or wear. All of these features combine to permit a pointer incorporating the present invention to be operated at a very high cyclic rate so that the pointing operation does not limit the production rate of a combined machine.

It is an important object of this invention to provide a novel and improved machine for pointing bolt blanks and the like which is capable of cutting the point on a bolt blank to a high degree of accuracy in a minimum period of time so that the pointer may be used in combined machines having a high production capacity and a high cyclic rate of operation.

It is another important object of this invention to provide a novel and improved pointer for bolt blanks and the like combining an indexing dial to transport blanks into and out of the cutting position with a cutter operable to perform the pointing operation in a minimum period of time.

It is still another object of this invention to provide a novel and improved pointer according to the last preceding object wherein the indexing dial is arranged to perform its indexing operation in a period of time substantially less than one-half the time of the machine cycle.

It is another important object of this invention to provide a novel and improved pointer, according to the last preceding object, wherein the loading and unloading positions are located 180° apart around the indexing dial periphery and the indexing angle for each indexing operation is less than 90°.

It is still another object of this invention to provide a novel and improved pointer for bolt blanks and the like provided with a cutter arranged so that the feed rate between the cutter and blank is programmed to remove a substantially constant area of material for each cutting revolution during the cutting operation.

It is still another object of this invention to provide a novel and improved pointer for bolt blanks and the like constructed and arranged so that certain operating functions are performed simultaneously to permit operation of the mechanism with a high cyclic rate.

It is still another object of this invention to provide a novel and improved pointer for bolt blanks and the like constructed and arranged so that the non-cutting operations require a minimum portion of the cyclic time of the mechanism and so that the cutter performs a cutting operation for a period of the cycle exceeding 50% thereof.

Further objects and advantages of this invention will appear from the following description and drawings wherein:

FIGURE 6 is a fragmentary longitudinal section through the cutter spindle;

Figure 1:
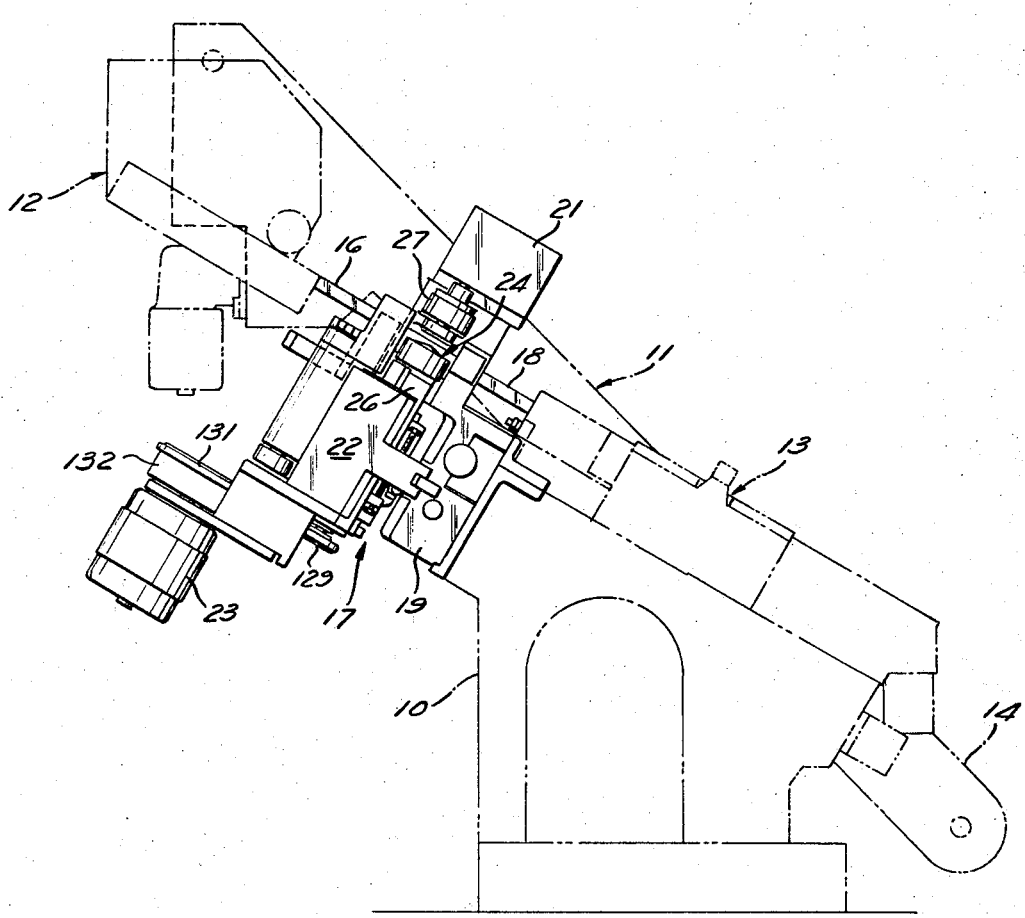
FIGURE 1 is a side elevation of a pointer incorporating this invention mounted for use in a combined machine including a header and a roll threader (the environment is illustrated in phantom line)

FIGURE 1 illustrates the pointer apparatus installed on a base 10 which also supports an elevator 11, a sorter assembly 12 and a thread rolling assembly 13. All of these assemblies are illustrated in phantom since they do not specifically relate to the particular pointer invention disclosed and claimed herein, but rather illustrate environment in which the pointer mechanism incorporating this invention is particularly suited for use. The arrangement illustrated is suited for use in a combined machine with a double-blow header (not illustrated) which discharges blanks onto the elevator 11 in the area indicated at 14.

The elevator 11 is provided with flights which engage and carry blanks from the area or zone 14 to the sorter 12. The blanks pass through the sorter 12 to feed tracks 16 which support the blanks by their heads as they slide along the tracks from the sorter 12 to the pointer assembly 17. After the blanks are pointed they are discharged into second tracks 18 along which the blanks slide to the thread rolling assembly 13. In order to provide gravity feeding of the blanks along the feed tracks 16 and 18 these tracks, along with the pointer assembly 17 and thread rolling assembly 13, are inclined from horizontal by an angle which in the illustrated embodiment is about 30°. It should be understood that the illustrated embodiment of this invention may be used in combined machines including various types of headers, such as double-blow headers, and progressive headers, or can be used with a hopper feed. Similarly a pointer assembly can be used with other types of thread forming devices or other blank forming mechanisms.

The pointer assembly 17 includes a frame 19 which supports an intermittent indexing drive 21 and a spindle support 22. The spindle support 22 is pivoted on the frame 19 so that it can swing out to provide access to the spindle assembly for servicing, but is locked in the illustrated position during pointer operation. A cutter drive motor 23 is mounted on the support 22 and is connected to rotate the cutter head 24. A spindle housing 26 is supported in the spindle support 22 for axial reciprocation to carry the cutter head 24 into cutting engagement with the blank. The indexing drive 21 is connected to rotate an indexing dial through an automatic overload release clutch 27 which limits loads in the event of jamming or the like.

Figure 2:
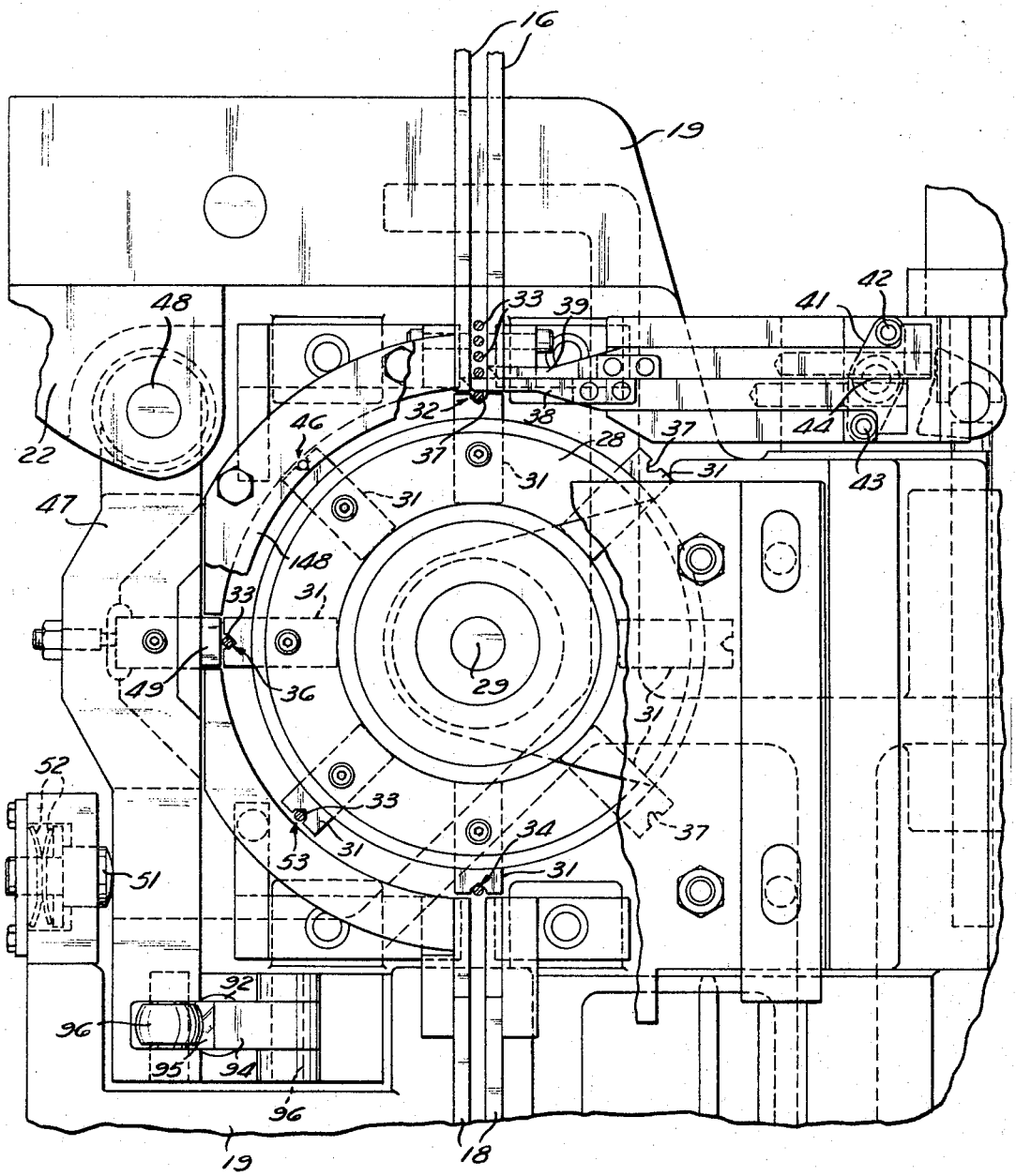
FIGURE 2 is a fragmentary plan view, illustrating the indexing dial, the loading injector, and the blank gripper, with parts removed for purposes of illustration.

Referring now to FIGURE 2, an indexing dial 28 is journaled on the pointer frame 19 for step-by-step rotation about a pivot axis 29. Mounted on the indexing dial are a plurality of gripper blocks 31 symmetrically positioned around the periphery of the dial. In the illustrated embodiment there are eight gripper blocks 31 spaced apart by an angle of 45° around the dial 28 and the indexing drive 21 is arranged to intermittently index the dial through an angle of 45° during each indexing operation. The blanks 33 slide down along the feed tracks 16 to a loading station 32. Spaced 180° around the dial 28 from the loading station 32 is a discharge station 34 aligned with the feed tracks 18. It is at this location that the blanks leave the pointer after the pointing operation. A pointing station 36 is located, in the illustrated embodiment, at the 90° position around the periphery of the dial midway between the loading station 32 and the discharge station 34.

Each of the gripper blocks 31 is formed with a notch 37 proportioned to receive the shank of the blank so that the blank is supported by its head and located by its shank on the indexing dial.

A separator and injector are located adjacent to the loading station 32 and function to positively move a blank 33 into the notch 37 of the aligned gripper block 31. This mechanism includes an injector finger 38 laterally slidable from an extended position as illustrated in FIGURE 2 to a retracted position in which the end of the injector finger is clear of the tracks 16. A separator finger 39 is positioned adjacent to the injector finger 38 and is also reciprocable along a line parallel to the line of movement of the injector finger 38.

Normally the injector finger 38 is in the extended position illustrated and the separator finger 39 is retracted clear of the track 16, as illustrated in FIGURE 2. This condition is maintained during the greater part of the machine cycle. A rocker arm 41 is connected at one end 42 to the separator finger 39 and at the other end 43 to the injector finger 38. The rocker arm is mounted on the shaft 44 for pivotal movement and is driven by a linkage, described below, from the position illustrated in FIGURE 2 in a counter-clockwise direction causing the withdrawal of the injector finger 38 and the extension of the separator finger 39.

The blanks 33 are carried by gravity down along the track 16 until the forwardmost blank engages the rearward side of the injector finger 38. Upon operation of the rocker arm 41 the separator finger 39 is extended and simultaneously the injection finger 38 is withdrawn. The ends of the two fingers 38 and 39 are formed with camming surfaces and this operation results in the separation of the forwardmost blank 33 from the remaining blanks and the movement of such blank into alignment with the end of the injector finger 38. Return of the two fingers to the position illustrated causes this forwardmost blank to be cammed into the notch 37 at the loading station 32. Consequently, a positive camming action is provided to load a single blank into the V-notch 37 at the loading station 33.

Rotation of the indexing dial 28 caused by the drive 21 then carries the blank through an angle of 45° until the blank is located at a first idling station 46. During this movement the previously loaded blank is carried to the pointing station 36. A gripper arm 47 is pivoted on the support 22 at 48 and is provided with a gripper block 49 adapted to engage a blank 33 at the pointing station and press it against the walls of the V-notch 37 of the adjacent block 31 to positively grip the blank and hold it during the pointing operation.

A plunger 51 is resiliently pressed by springs 52 against the gripper arm 47 in a direction causing gripping of the blank by the gripper block 49 and provides the gripping force utilized to hold the blank during the pointing operation. A cam operated linkage, described below, operates to overcome the action of the springs 52 and move the gripper arm 47 in a clockwise direction when the blank is to be released. This cam linkage is arranged so that the gripper block 49 engages and grips the blank 33 at the pointing station 36 as soon as indexing is completed and retains such gripping during the entire cutting operation. As soon as the cutting operation is completed the gripping is released so that the subsequent indexing operation can be performed. The use of springs to produce the gripping force rather than cams, or the like, insures that a uniform gripping force will be provided and prevents the occurrence of overloads or unnecessary marking of the blank shank.

After the completion of the pointing the indexing dial 28 is again indexed to carry the pointed blank to an idler station 53. On the subsequent indexing operation the pointed blank is carried to the discharge station 34. Since the indexing occurs during a small portion of the machine cycle time the indexing dial is stationary for sufficient time so that gravity may be utilized to carry the pointed blank out of the discharge station 34 and down along the tracks 18.

The indexing dial 28 serves to simultaneously move each succeeding blank from the idler station 46 to the pointing station 36 and move the pointed blank from the pointing station 36 to the idler station 53. Therefore, the feed and removal of the blanks into and out of the pointing station occurs simultaneously with a simple mechanism which can be operated at substantially any desired speed.

Figure 3:
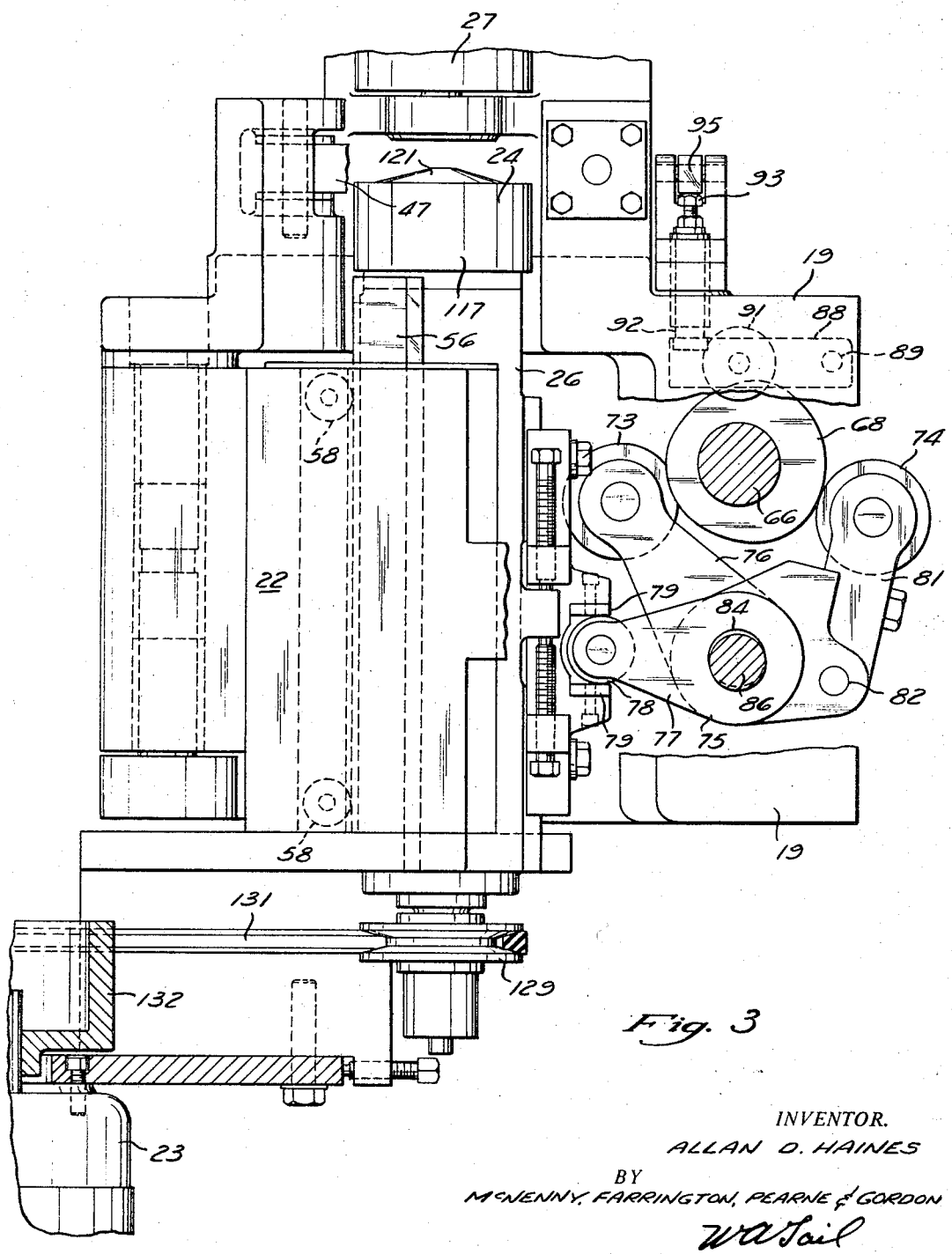
FIGURE 3 is a fragmentary side elevation, with parts removed for purposes of illustration, showing the cutter spindle drive.
Figure 4:
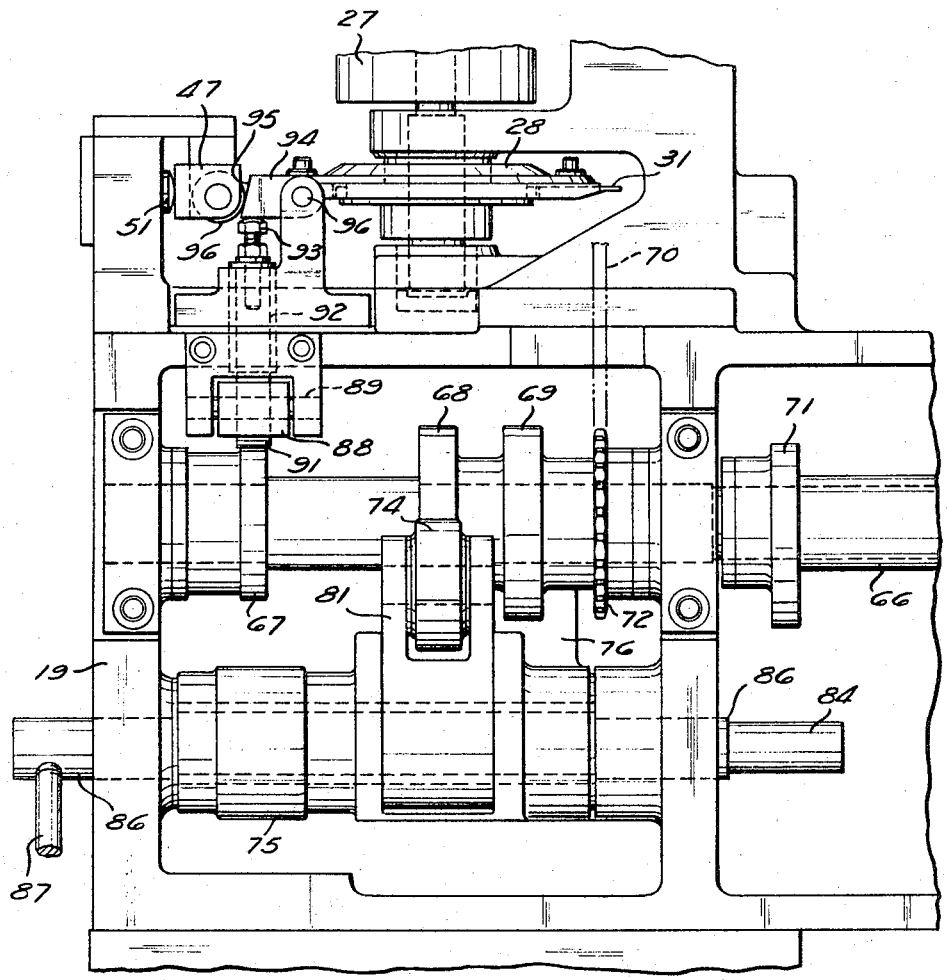
FIGURE 4 is a fragmentary side elevation illustrating the cam drive mechanism.
Figure 5:
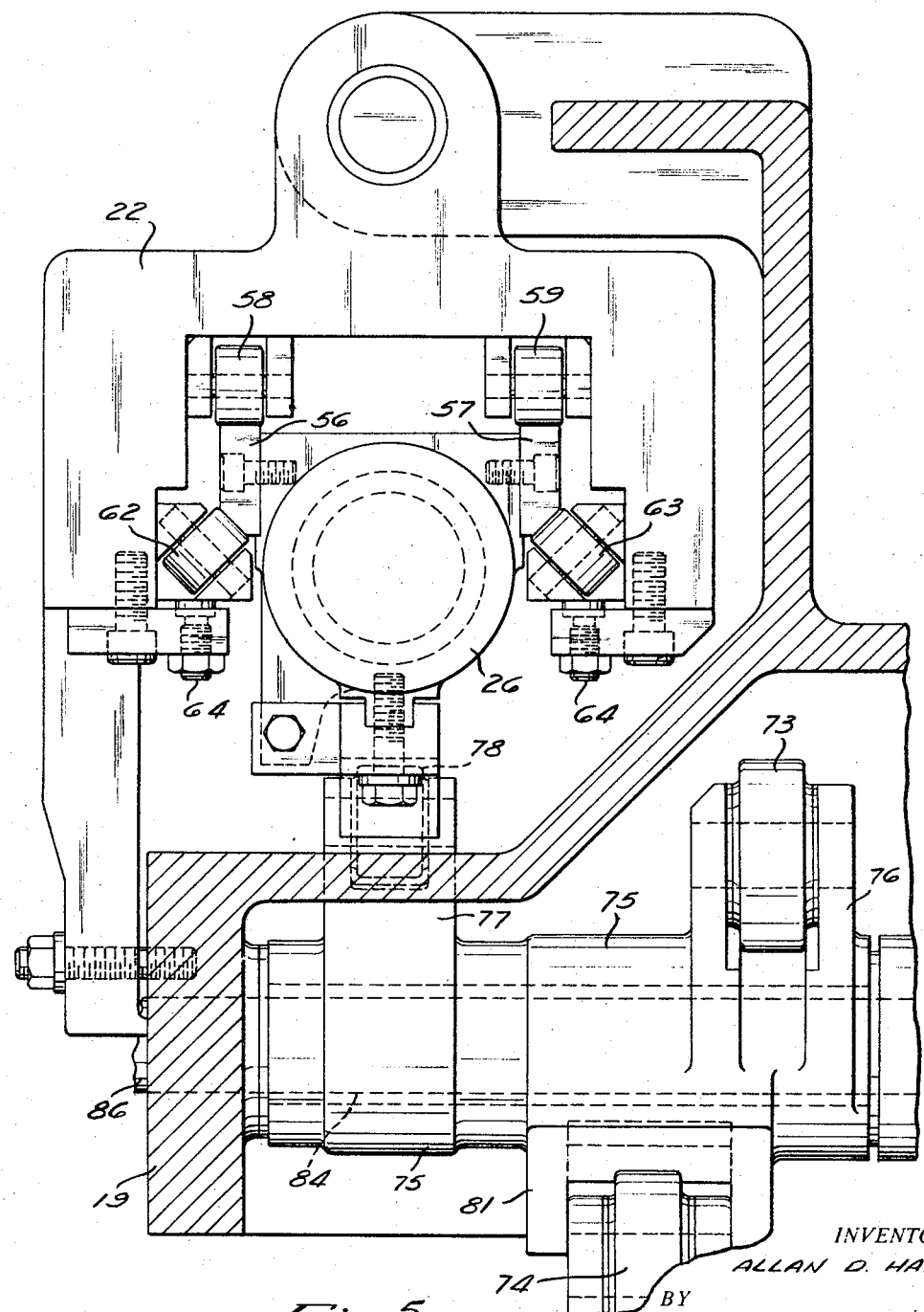
FIGURE 5 is a fragmentary cross-section illustrating the arrangement of cutter spindle bearings.

Referring now to FIGURES 3 through 5, the cutter head 24 is mounted at the top of a rotating spindle assembly which is journaled within the axially reciprocable spindle housing 26. The spindle housing 26 is provided with opposed axially extending hardened bearing blocks 56 and 57. Spaced axially along the bearing blocks 56 and 57 are roller support assemblies one of which is illustrated in FIGURE 5. Each of these assemblies includes a pair of co-axial rollers 58 and 59 which engage corresponding surfaces on the bearing blocks 56 and 57, respectively. The bearing assemblies also include a pair of inclined rollers 62 and 63 which engage inclined surfaces on the bearing blocks 56 and 57 and cooperate with the rollers 58 and 59 to locate the spindle housing against movement in all directions other than the axial direction. The inclined rollers 62 and 63 are adjustably preloaded by preloading screws 64 so that very accurate guiding of the spindle housing is provided. A similar roller assembly is located at the upper end of the spindle housing as best illustrated in FIGURE 3.

The vertical oscillation or reciprocation of the spindle housing is produced by a cam and cam follower linkage. A cam shaft 66 is journaled in the pointer frame and is normally connected to be driven by a power takeoff shaft from the header so that it rotates in timed relation to the operation of the header. As illustrated best in FIGURE 4 there are four cams 67, 68, 69 and 71 mounted for rotation with the cam shaft 66. In addition, a chain sprocket 72 is mounted for rotation with the cam shaft 66 and is connected to the intermittent indexing drive 21 by a chain 70.

The two cams 68 and 69 operate to reciprocate the spindle housing 26 by means of a pair of opposed cam followers 73 and 74. The cam followers 73 engages the cam 68 and the cam follower 74 engages the cam 69. A follower support member 75 is journaled on a shaft 84 and is formed with a first arm 76 supporting the follower 73. A second arm 77 on the member 75 supports a roller 78. The roller 78 is positioned between opposed bearings 79 adjustably carried by the spindle housing 26 so that oscillating movement of the member 75 produces axial reciprocation of the spindle housing 26.

The cam follower 74 is mounted on an arm 81 pivoted at 82 on the member 75 and is spring-loaded in an anti-clockwise direction, as viewed in FIGURE 3. The two cams 68 and 69 are shaped so that rotation of the cam shaft 66 from the position illustrated in FIGURE 3 causes anti-clockwise rotation of the arm 77 and downward movement of the spindle housing 26 to a retracted position and then upward movement back to the illustrated position upon completion of one revolution of the cam shaft 66.

In order to provide a running adjustment of the position of the spindle housing 26 to compensate for cutter wear, and the like, the follower support shaft 84 is provided with eccentric sections 86 journaled in the frame 19. A handle 87 is mounted on the end of the shaft 84 to permit the operator to rotate the shaft 84. This coupled with the eccentric mounting of the shaft 84 with respect to the member 75 causes raising and lowering of the cam follower support member 75. This provides limited adjustment of the upward extreme position of the spindle housing 26 and permits the operator to make such adjustments without shutting the machine down.

The operation of the gripper arm 47 is controlled by the cam 67. Mounted above the cam 67 is a follower arm 88 pivoted on the frame at 89 and provided with a roller follower 91. The end of the follower arm 88 engages the bottom end of a pusher pin 92 provided with an adjustment screw 93 at its upper end. The screw 93 engages a rocker arm 94 pivoted at 96 on the frame. The end face 95 of the rocker arm 94 is engaged by a roller 96 on the gripper arm 47 and is shaped so that clockwise rotation of the rocker arm 94 moves the gripper arm toward the released position and anti-clockwise rotation permits the spring 52 to move the gripper arm 47 to the gripping position.

Figure 9:
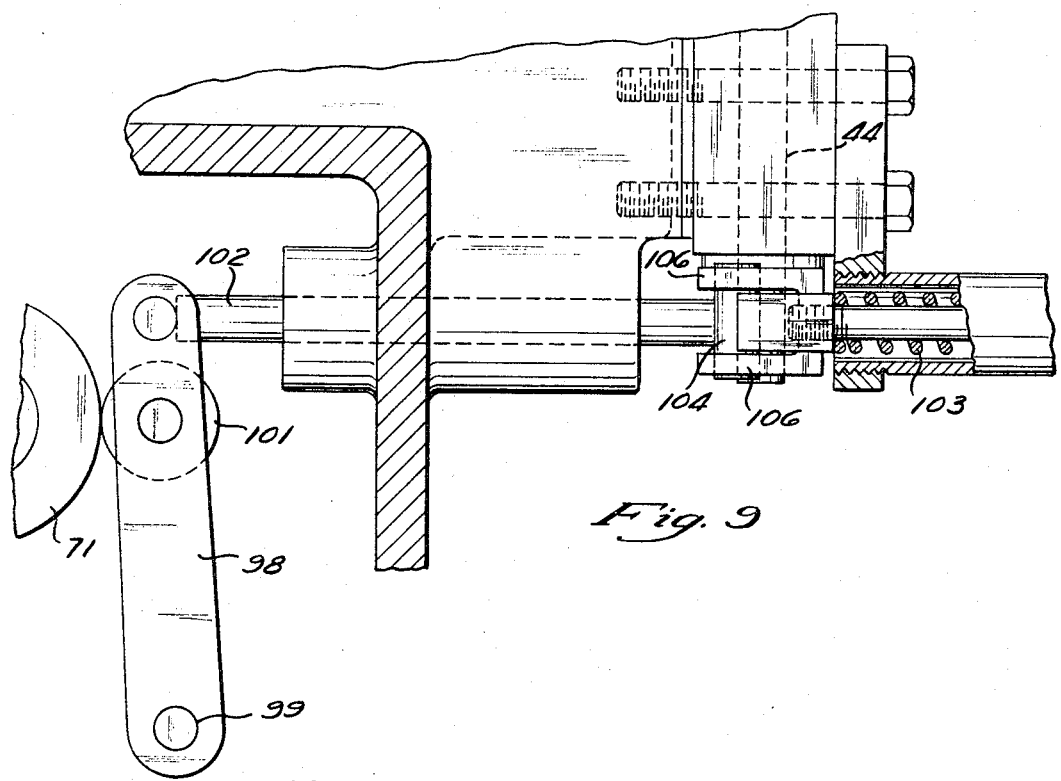
FIGURE 9 is a fragmentary view of the injector drive mechanism.

The cam 71 operates the ejector separator mechanism. Referring to FIGURES 2 and 9, a cam follower arm 98 is pivoted at 99 and is provided with a roller follower 101 engaging the cam 71. The end of the follower arm 98 engages a push rod 102 which is spring-loaded in a direction toward the follower arm by a spring 103. The end of the push rod 102 opposite the follower arm engages a pin 104 supported on trunnions 106 mounted on the shaft 44. The upper end of the shaft 44 supports the rocker arm 41 illustrated in FIGURE 2, which in turn operates the separator finger 39 and the injector finger 38 in a manner discussed above.

Referring now to FIGURE 6, the cutter head 24 is removably mounted by means of a tapper 110 and drawbolt 111 in a rotating spindle 112. The spindle 112 is supported for rotation within the spindle housing 26 at its upper end by anti-friction bearings 113 and at its lower end by anti-friction bearings 114. The bearings are arranged so that the spindle 112 is axially fixed and supported for rotation about its longitudinal axis within the spindle housing 26. Multiple bearings are used to prevent chatter even when operating at high cutting speeds. In the illustrated structure the upper bearings 113 axially fix the spindle 112 with respect to the spindle housing 26 and the lower bearings 114 provide only radial support.

Mounted on the spindle 112 below the cutter head 24 is a deflector plate 116 provided with a depending flange coacting with an upstanding flange on a chip cover 117, to prevent chips from entering the bearing area. Similarly, at the lower end of the spindle 112, a bearing retaining ring 118 is threaded onto the spindle and co-acts with an end plate 119 to prevent foreign matter from entering the lower bearing zone.

The cutter head assembly is provided with a conical cover plate 121 closely fitting an opening 122 in the housing 117. The actual cutting occurs below the cover member 121 with the blank 33 extending through an opening 123. Chips are therefore trapped within the housing 117 and are thrown out along a chute 126 and down along a section 127 which telescopes into a discharge chute 128.

Referring to FIGURE 3, the spindle 112 is driven by a pulley 129 connected by a V-belt 131 to a flat-faced drum pulley 132 on the motor 23. The electric motor 23 is therefore not required to move up and down with the spindle since the belt 131 can ride up and down along the face of the drum pulley 132.

Figure 7:
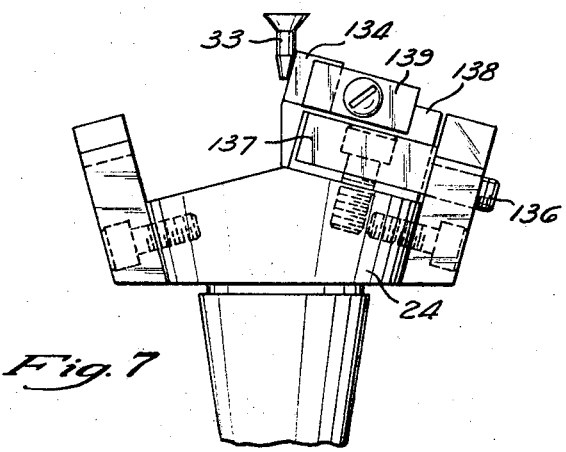
FIGURE 7 is an enlarged fragmentary side elevation of the cutter head with parts removed.
Figure 8:
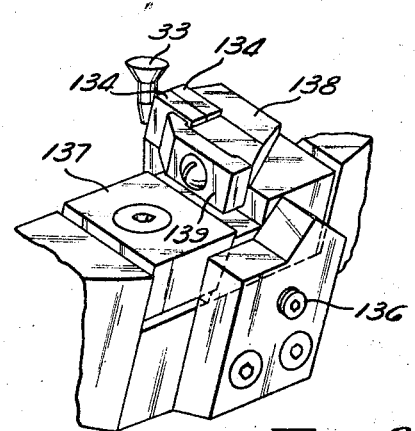
FIGURE 8 is a fragmentary perspective view of the cutter mounting illustrated in FIGURE 7.

Referring now to FIGURES 7 and 8, the cutter elements 134 are preferably square so that they each provide four cutting edges along each face for a total of eight cutting edges on each element. In FIGURE 7 the cutters mounted on the left are not illustrated, but it should be understood that similar cutters are mounted on the left side of the cutter head so that opposite sides of the blank 33 are engaged and the radial components of the cutting forces are balanced. Radial adjustment of the cutter assembly is provided by an adjusting screw 136. Preferably two cutter elements 134 are mounted adjacent to each other, as best illustrated in FIGURE 8, to provide support and increased strength. A wedge block 137 locks the cutter support 138 in its adjusted position and a clamp member 139 secures the cutters 134 on the support 138.

Figure 10:
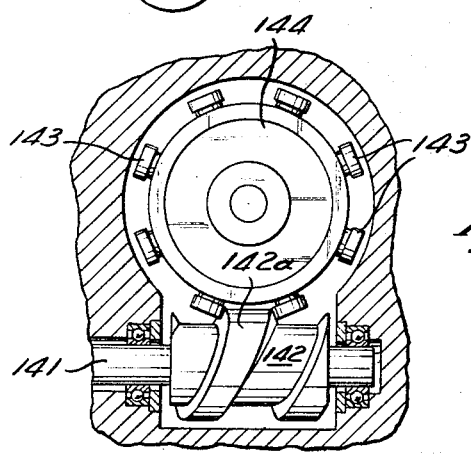
FIGURE 10 is a fragmentary schematic illustration of the indexing drive.

FIGURE 10 is a schematic illustration of one form of indexing drive which may be used to rotate the dial 28. The unit includes a drive shaft 141 rotated by the sprocket 72 (illustrated in FIGURE 4) and connecting chain drive. Mounted on the drive shaft is a cam 142 having a projection 142a which engages and drives rollers 143 symmetrically positioned around a driven element 144 on the output shaft of the device. The projection 142a is shaped to lock the output or driven element in an indexed position during about two-thirds of a revolution of the cam 142 and to produce the indexing rotation within a period of time equal to about one-third of a revolution. The output shaft of the indexing mechanism is connected through the over-load clutch 27 to the dial support shaft 146 (illustrated in FIGURE 6).

Figure 6A:
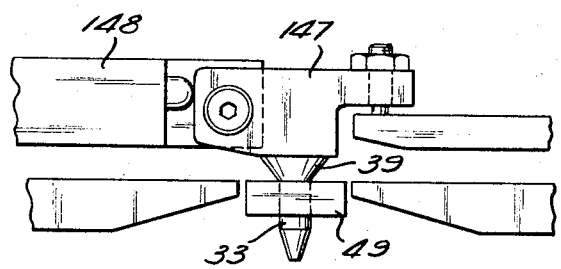
FIGURE 6a is an enlarged fragmentary side elevation illustrating the blank in the pointing position.

FIGURE 6a illustrates the blank hold-down lever 147 which is pivoted to the cover-plate 148 immediately above the pointer station. The hold-down lever 147 is resiliently urged in a clockwise direction as viewed in FIGURE 6a to press the blank 33 downward and insure that the blank is in its proper axial position prior to gripping by the gripper block 49.

Figure 11:
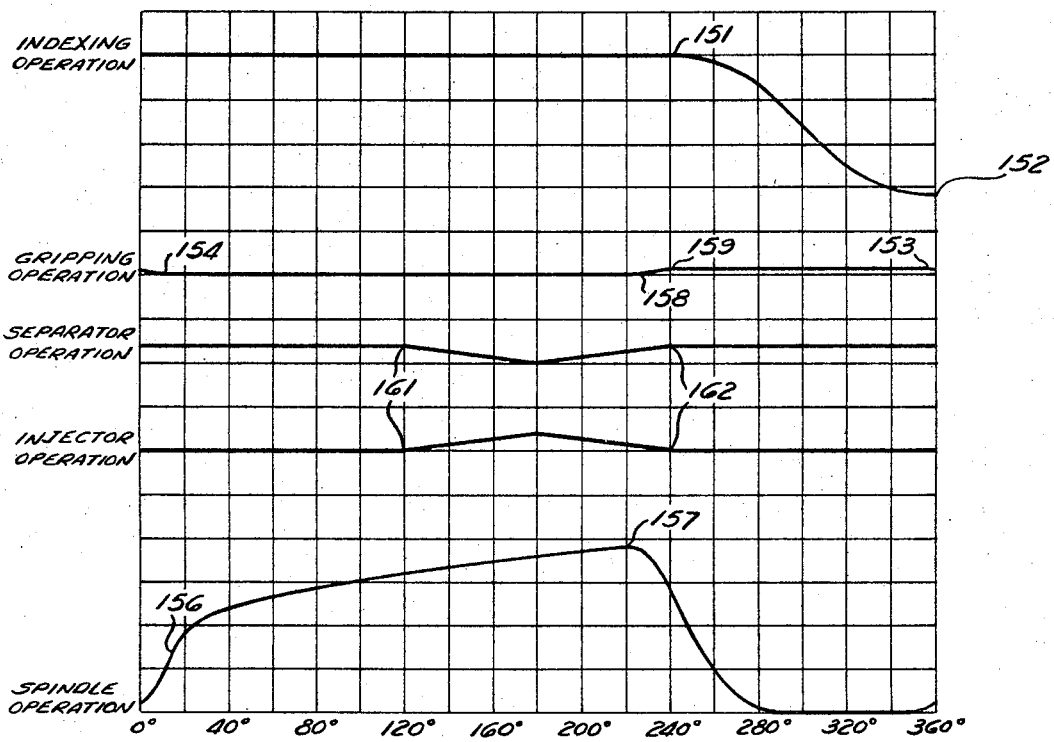
FIGURE 11 is a timing diagram for the machine.

FIGURE 11 is a timing diagram of one machine incorporating this invention with time plotted in degrees. One cycle is equal to 360°. Indexing occurs between 151 and 152 during a period of the cycle of about 120° or one-third of the total 360° cycle time. Consequently, the blank is in the cutting position during a period approaching 240° or two-thirds of the cycle. The gripping controlled by the cam 67 is preferably arranged so that the gripping operation is commenced at 153 just before indexing is completed and is completed at 154 within a period of time equal to about 15° of the cycle. The cam 68 powers the cutter in an upward direction and is arranged to commence the upward movement of the cutting head 24 toward the blank at a position of about 350° with the gripping being completed at a position of about 10°. The blank is actually engaged by the cutter soon after the gripping is completed at about 156 and continues until about the 220° position at 157. Consequently, the cutting is actually performed during a period well over one-half of the cycle time of the apparatus.

The profile of the cam 68 is arranged so that initially the feed of the cutters in an upward direction is rapid and as soon as cutting is commenced the rate of feed of the cutters is reduced throughout the cutting operation. The profile of the cam 68 is arranged so that the volume or area of stock removed during each cutter revolution is substantially constant throughout the cutting cycle. Consequently, the rate is fastest as the cutter engages the sharp corner at the end of the shank and is reduced as the length of the cut along the cone is increased. With such an arrangement the cutter feed and cutter life is achieved with a minimum amount of wear and minimum loads on the system.

The retraction, or lowering, of the cutters starting at 157 is rapid so that the cutters clear the blank as quickly as possible. The gripping is released between 158 and 159 with a slight delay after the completion of cutting to insure that the cutters are out of contact with the blank.

As soon as the gripping is released, the next indexing operation commences.

The ejector and separator operation is performed between 161 and 162 while the cutting is occurring and the indexing device is stationary. The separator finger 39 is retracted clear of the tracks 16 for a period of time of about 240° so the blanks 33 have a relatively long period of time to slide down against the injector finger 38 under the influence of gravity.

Because the indexing dial is capable of simultaneously moving one blank into the pointed position while the previous blank is moved out of this position, the feeding time of the blank into and out of the pointing position is minimized to about one-third of the time of the cycle. Also, the fact that the cutter is started toward the blank before the indexing is completed and the gripping is completed insures that a minimum amount of time is lost prior to the actual cutting. Because of the positive action of injecting the blanks into the indexing dial the loading of the blanks can be performed in a relatively short period of time. Actual operating speeds of 325 cycles per minute have been achieved when operating on blanks used to form wood screws wherein the initial shank diameter is about ⅛ of an inch.

The coaction of the various elements and sub-assemblies within the machine permit very rapid cyclic operation and result in a high production rate even though a substantial amount of machining is provided during each cycle.

While presently preferred embodiments of the apparatus and method of the present invention have been described herein, with reference to the accompanying drawings, it is to be understood that various modifications, omissions and refinements which depart from the disclosed embodiments may be adopted without departing from the spirit and scope of this invention as defined in the following claims:

What is claimed is:

1. A pointer for a blank having a cylindrical portion comprising a rotatable dial, power operated drive means connected to step-by-step rotate said dial through a plurality of indexing positions, a plurality of blank-receiving means symmetrically located around said dial, power operated loading means operable to position a blank in each of said blank-receiving means when each such means moves to a loading position, power operated gripping means operable to securely grip each blank in said blank-receiving means at least when each blank is carried by said dial to a pointing position, a rotating cutter operable to point a blank gripped by said gripping means at said pointing position, said cutter being reciprocable into cutting relationship with a blank at said pointing position, power operated feed means operable to move said cutter against said blank, a rotatable power input shaft, and separate mechanical means connecting said power input shaft and each of said power operated means for cyclic operation in timed relationship, each of said mechanical means being connected to said input shaft and constructed with relationship to the other mechanical means so that said power operated drive means operates to move said dial between said indexed positions during a period substantially less than one-half the time of said cycle and maintaining it stationary in said indexed position the remaining period of the cycle, said power operated loading means operates to load a blank while said dial is stationary, said power operated gripping means operates to grip a blank during substantially the entire period said dial is stationary, and said power operated feed means operates to move said cutter against a blank only while the blank is gripped and for a period exceeding one-half the time of a cycle, at least a portion of the operation of said loading means occurring while said cutter is in engagement with said gripped blank.

2. A pointer as set forth in claim 1 wherein said cutter forms a generally conical end on said blank, and said feed means controls the rate of cutter movement so that said cutter removes blank material having a substantially equal area during each cutter revolution.

3. A pointer as set forth in claim 1 wherein said gripping means includes resilient means to apply gripping pressure and power means operative to overcome said resilient means and release said gripping means.

4. A pointer as set forth in claim 1 wherein an unloading position is provided at which pointed blanks are removed from said blank-receiving means, and an idle position is provided between said loading position and unloading position.

5. A pointer as set forth in claim 1 wherein an unloading position is located directly opposite said loading position, said pointing position is midway between said loading and unloading positions, and an idle position is located between said pointing position and both said loading and unloading positions, said drive means rotating said dial through an angle no greater than 45° during each step of rotation.

6. A pointer as set forth in claim 1 wherein said dial rotates about an axis inclined with respect to the vertical and a discharge position is located at the lowest position adjacent to the dial periphery, said blanks being removed by gravity from said recesses, and guide means are provided along which said blanks move into said loading means under the influence of gravity, said loading means operating so that the period during which blanks are free to move thereinto under the influence of gravity is a period substantially equal to two-thirds of a cycle.

7. A pointer for a blank having a cylindrical portion comprising a rotatable dial, drive means connected to step-by-step rotate said dial through a plurality of indexing positions, a plurality of blank-receiving means symmetrically located around said dial, loading means operable to position a blank in each of said blank-receiving means when each such means moves to a loading position, gripping means operable to securely grip each blank in said blank-receiving means at least when each blank is carried by said dial to a pointing position, a rotating cutter operable to point a blank gripped by said gripping means at said pointing position, said cutter being reciprocable into cutting relationship with a blank at said pointing position, feed means operable to move said cutter against said blank, said cutter rotating about an axis co-axial with a blank at said pointing position and being supported on a preloaded bearing for reciprocating motion along said axis, a rotating shaft providing the drive power and timing of the reciprocation of said cutter, the operation of said drive means, the operation of said loading means, and the operation of said gripping means, and adjustable means permit adjustment of the reciprocation of said cutter while said pointer is operating.

8. A pointer as set forth in claim 7 wherein cams on said shaft cooperate with associated cam followers to reciprocate said cutter to operate said loading means and operate said gripping means, and said drive means in an intermittent drive driven by said shaft.

9. A pointer comprising gripping means to grip a cylindrical blank and support it in a fixed position, a rotating cutter journaled for rotation about an axis co-axial with the axis of a blank held by said gripping means, means for axially moving said cutter from a retracted position to a cutting position, a cover rotatably carried by said cutter formed with a clearance aperture, the end of said blank being spaced from said cover on the side opposite said cutter when said cutter is in said retracted position and projecting through said aperture when said cutter and blank are in said cutting position, and non-rotating duct means around said cutter cooperating with said cover to confine chips removed by said cutter, said duct including a telescoping section to accommodate said axial movement of said cutter and cover.

10. A pointer for a blank having a cylindrical portion comprising a rotatable dial, drive means connected to step-by-step rotate said dial through a plurality of indexing positions, a plurality of blank-receiving means symmetrically located around said dial, loading means operable to position a blank in each of said blank-receiving means when each such means moves to a loading position, gripping means operable to securely grip each blank in said blank-receiving means at least when each blank is carried by said dial to a pointing position, a rotating cutter operable to point a blank gripped by said gripping means at said pointing position, said cutter being reciprocable into cutting relationship with a blank at said pointing position, feed means operable to move said cutter against said blank, said pointer including a frame supporting said drive means, dial, loading means and gripping means, and said cutter is supported on a member pivoted on said frame, said member being pivotably movable from an operating position to move said cutter away from said dial and provide access to said cutter.

References Cited
UNITED STATES PATENTS

| 1,719,230 | 7/1929  | McDonald  | 10—169    |
| 1,864,450 | 6/1932  | Lozier    | 10—21     |
| 2,020,660 | 11/1935 | Friedman  | 10—21 XR  |
| 2,982,978 | 5/1961  | Wilson    | 10—169 XR |
| 3,146,471 | 9/1964  | Edmondson | 10—21 XR  |

FOREIGN PATENTS 1,003,169  2/1957  Germany.

LEONIDAS VLACHOS, *Primary Examiner.*

U.S. Cl. X.R.

10—9, 169